(12) United States Patent
Noguchi et al.

(10) Patent No.: US 12,172,671 B2
(45) Date of Patent: Dec. 24, 2024

(54) VEHICLE NAVIGATION APPARATUS

(71) Applicant: SUBARU CORPORATION, Tokyo (JP)

(72) Inventors: Shuntaro Noguchi, Tokyo (JP); Chihiro Sugano, Tokyo (JP); Masato Yano, Tokyo (JP); Naoto Kuriyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 200 days.

(21) Appl. No.: 17/850,365

(22) Filed: Jun. 27, 2022

(65) Prior Publication Data

US 2023/0011080 A1    Jan. 12, 2023

(30) Foreign Application Priority Data

Jul. 9, 2021   (JP) .................................. 2021-114561

(51) Int. Cl.
*B60W 60/00* (2020.01)
*G01C 21/34* (2006.01)

(52) U.S. Cl.
CPC ....... *B60W 60/001* (2020.02); *G01C 21/3407* (2013.01); *B60W 2556/40* (2020.02)

(58) Field of Classification Search
CPC ............ B60W 60/001; B60W 2556/40; G01C 21/3407; G01C 21/3655; G01C 21/367; G01C 21/3676; G01C 21/3415
See application file for complete search history.

(56) References Cited

U.S. PATENT DOCUMENTS

| | | | | |
|---|---|---|---|---|
| 2007/0088502 | A1* | 4/2007 | Oumi | G01C 21/3641 701/417 |
| 2018/0100746 | A1* | 4/2018 | Jenkins | G01C 21/3415 |
| 2019/0018410 | A1 | 1/2019 | Ando | |
| 2019/0299947 | A1* | 10/2019 | Higashitani | B60T 7/22 |
| 2020/0339147 | A1* | 10/2020 | Hayakawa | B60K 35/00 |

FOREIGN PATENT DOCUMENTS

JP   2019-20782 A   2/2019

* cited by examiner

*Primary Examiner* — Kenneth J Malkowski
*Assistant Examiner* — Ibrahim Abdoalatif Alsomairy
(74) *Attorney, Agent, or Firm* — TROUTMAN PEPPER HAMILTON SANDERS LLP

(57) ABSTRACT

A vehicle navigation apparatus includes a vehicle navigation unit and a route guidance control unit. The vehicle navigation unit includes a route setting unit and a navigation control unit. The route setting unit sets a route to a destination point on the basis of information on a position of a vehicle, information on a destination point, and first map information stored in a storage. The navigation control unit performs guidance on the route and controls the form of displaying the route on a display. The route guidance control unit includes at least one processor determining the driving entity of a vehicle. In a case where the at least one processor determines that the driving entity of the vehicle is the vehicle itself and the vehicle deviates from the route, the at least one processor stops the guidance until the vehicle reaches a next waypoint of the route.

8 Claims, 8 Drawing Sheets

VEHICLE NAVIGATION APPARATUS

CROSS-REFERENCE TO RELATED APPLICATION

The present application claims priority from Japanese Patent Application No. 2021-114561 filed on Jul. 9, 2021, the entire contents of which are hereby incorporated by reference.

BACKGROUND

The technology relates to a vehicle navigation apparatus.

In recent years, automatic driving control, which automatically controls driving operations of a vehicle, has been known.

A vehicle control apparatus that achieves the automatic driving control is known. The vehicle control apparatus sets a traveling route to a destination point on the basis of map information, and controls driving operations of the vehicle along the traveling route on the basis of information acquired by an in-vehicle sensor. Reference is made to Japanese Unexamined Patent Application Publication (JP-A) No. 2019-20782, for example.

For example, the apparatus described in JP-A No. 2019-20782 sets a traveling route to a destination point on the basis of map information stored in the apparatus, and achieves the automatic driving control on the basis of the traveling route and information on the surrounding environment around an own vehicle acquired by an in-vehicle sensor.

An electronic control unit (ECU) mounted in the own vehicle determines whether the map information stored in the apparatus matches with measurement-point information acquired by the in-vehicle sensor. If the ECU does not determine that the map information matches with the measurement-point information while the automatic driving control is being executed, the mode of the automatic driving control is switched on the basis of the result of determination.

SUMMARY

An aspect of the technology provides a vehicle navigation apparatus including a vehicle navigation unit and a route guidance control unit. The vehicle navigation unit includes: a storage configured to store first map information; a position information acquisition unit configured to acquire information on a position of a vehicle; a route setting unit configured to set a route to a destination point set by an occupant of the vehicle on the basis of the information on the position of the vehicle, information on the destination point, and the first map information; a display configured to display at least the first map information, the route, and the information on the position of the vehicle to the occupant of the vehicle; and a navigation control unit configured to perform guidance to the destination point along the route set by the route setting unit for the occupant, and control a form of displaying the route on the display. The route includes one or more waypoints that the vehicle is to pass through. The route guidance control unit includes at least one processor and at least one memory communicably coupled to the at least one processor. The at least one processor is configured to determine a driving entity of the vehicle, and in a case where the at least one processor determines that the driving entity of the vehicle is the vehicle itself and the vehicle deviates from the route, cause the navigation control unit to stop the guidance until the vehicle reaches a next waypoint among the one or more waypoints that the vehicle is to pass through next. The guidance includes displaying the route, performing the guidance on the route with sounds, performing the guidance on the route with characters, indicating a traveling direction, and providing road information on the route.

An aspect of the technology provides a vehicle navigation apparatus including a storage, circuitry, and a display. The storage is configured to store first map information. The circuitry is configured to acquire information on a position of a vehicle; set a route to a destination point set by an occupant of the vehicle on the basis of the information on the position of the vehicle, information on the destination point, and the first map information. The circuitry is configured to perform guidance to the destination point along the route for the occupant. The circuitry is configured to determine a driving entity of the vehicle. The route includes one or more waypoints that the vehicle is to pass through. The display is configured to display at least the first map information, the route, and the information on the position of the vehicle to the occupant of the vehicle. The circuitry is configured to control a form of displaying the route on the display, and in a case where the circuitry determines that the driving entity of the vehicle is the vehicle itself and the vehicle deviates from the route, stop the guidance until the vehicle reaches a next waypoint among the one or more waypoints that the vehicle is to pass through next. The guidance includes displaying the route, performing the guidance on the route with sounds, performing the guidance on the route with characters, indicating a traveling direction, and providing road information on the route.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 6 is a diagram illustrating an exemplary route displayed on a vehicle navigation unit according to one example embodiment of the technology when the own vehicle reaches the next waypoint to pass through.

DETAILED DESCRIPTION

Figure 1:
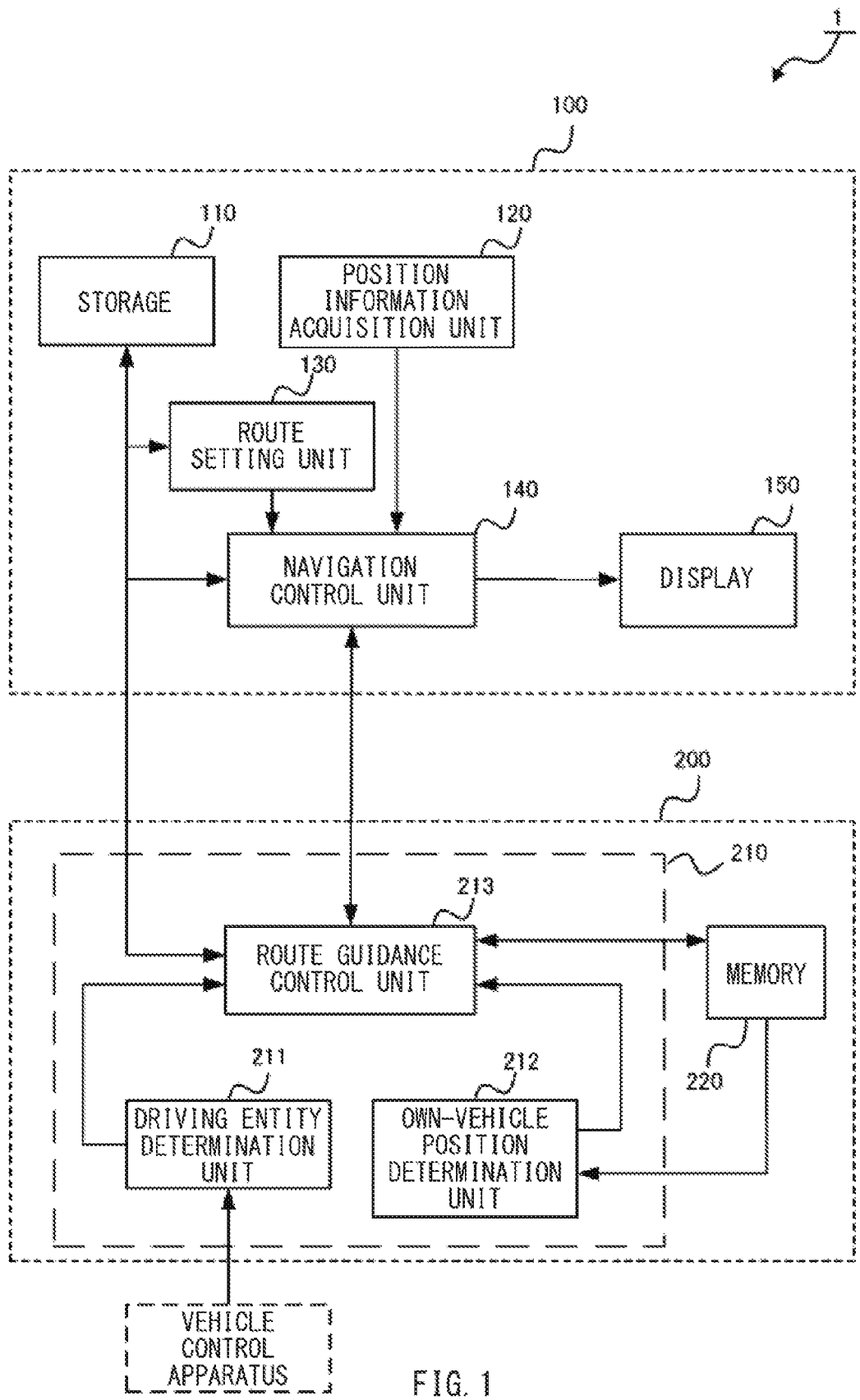
FIG. 1 is a block diagram illustrating an exemplary configuration of a vehicle navigation apparatus according to one example embodiment of the technology.

A possible measure to achieve automatic driving by using information received by a vehicle navigation apparatus involves setting a destination point to the vehicle navigation apparatus, and determining a traveling route along which the automatic driving is to be achieved on the basis of a route generated from a navigation map.

The navigation map, however, takes time and costs when being updated, and is thus updated at a predetermined constant interval.

That is, the navigation map is updated less frequently than a high definition map used for automatic driving control. This difference in update frequency results in discrepancies between the navigation map and the high definition map.

For example, in a case where the vehicle travels on a route inexistent in the route generated from the navigation map, a route displayed on the vehicle navigation apparatus differs from the route on which the vehicle is actually traveling. As a result, the vehicle is displayed as being traveling through points of a route inexistent in the navigation map. This can make an occupant of the own vehicle feel strange. The occupant of the own vehicle can be made feel strange also in driving assistance control for the same reason.

It is therefore desirable to provide a vehicle navigation apparatus that reduces the strange feeling of the occupant of the own vehicle by setting a waypoint and stopping the route guidance when the own vehicle traveling in an automatic driving mode or a driving assistance mode deviates from a set route.

Some example embodiments of the technology will now be described with reference to FIGS. 1 to 10. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

A vehicle navigation apparatus 1 according to a first example embodiment will now be described with reference to FIGS. 1 to 6.

<Exemplary Configuration of Vehicle Navigation Apparatus 1>

As illustrated in FIG. 1, the vehicle navigation apparatus 1 according to the first example embodiment includes a vehicle navigation unit 100 and a route guidance control unit 200.

The vehicle navigation unit 100 searches for a route to a destination point set by an occupant of a vehicle on the basis of information on a position of an own vehicle, information on the destination point, and first map information, and sets the route to the destination point. The set route may include waypoints which the own vehicle is to pass through.

The vehicle navigation unit 100 may receive road condition information such as traffic information, and display traffic congestion information or other information about peripheral roads including the set route, to thereby achieve route guidance for the occupant.

In a case where the driving entity of the own vehicle is determined as being the vehicle itself in the first example embodiment, the vehicle navigation unit 100 stops or restarts the route guidance on the basis of control information outputted from the route guidance control unit 200 described below until the own vehicle reaches the next waypoint of the route. Note that the term "route guidance" used herein may encompass displaying a route, performing the guidance on the route with sounds, performing the guidance on the route with characters, indicating a traveling direction, and providing road information on the route.

The vehicle navigation unit 100 will be described in detail below.

The route guidance control unit 200 may determine whether the own vehicle has deviated from the set route on the basis of driving entity information, the first map information, the set route, and other pieces of information. The driving entity information may indicate in which mode of an automatic driving mode, a driving assistance mode (i.e., a mode in which the driving entity is the vehicle), and a manual drive mode (i.e., a mode in which the driving entity is the driver) the own vehicle is traveling.

In a case where the own vehicle traveling in the automatic driving mode or the driving assistance mode deviates from the set route, the route guidance control unit 200 may output control information to the vehicle navigation unit 100 to stop or restart the route guidance, which includes displaying the route set by the navigation control unit, performing the guidance on the route with sounds, performing the guidance on the route with characters, indicating a traveling direction, and providing the road information on the route until the own vehicle reaches the next waypoint to pass through.

The route guidance control unit 200 will be described in detail below.

As illustrated in FIG. 1, the vehicle navigation unit 100 includes a storage 110, a position information acquisition unit 120, a route setting unit 130, a navigation control unit 140, and a display 150.

The storage 110 may store various kinds of programs, including a control program, necessary to operate the vehicle navigation unit 100, the first map information, and probe traffic information. The probe traffic information may be traveling history information on the own vehicle generated from information indicating a current traveling position of the own vehicle, vehicle speed information, and other pieces of information.

The storage 110 may include, for example, a hard disc drive (HDD) or a solid state drive (SSD).

The position information acquisition unit 120 may receive the information on the position (i.e., the data on latitude and longitude) of the own vehicle from a GPS receiver and various kinds of information from an azimuth sensor, a range sensor, an acceleration sensor, and other sensors. The position information acquisition unit 120 may acquire the information on the position (i.e., the data on latitude and longitude) of the own vehicle at a predetermined timing on the basis of the information received from the GPS receiver, and output the information on the position of the own-vehicle to the navigation control unit 140 described below.

The route setting unit 130 may set a route to a destination point including waypoints which the own vehicle is to pass through on the basis of the information on the position of the vehicle, information on the destination point set by the occupant of the vehicle, and the first map information.

For example, the route setting unit 130 may perform a route searching process on the basis of the first map information. The route setting unit 130 may search for a route (guidance route) connecting a departure point and the destination point set by the occupant in accordance with a predetermined searching condition, and set the route.

In this example, the waypoint may be an intersection between a route or a road in the first map information and a route or a road in second map information.

The route and the waypoints set by the route setting unit 130 may be sent to and stored in the storage 110 through the navigation control unit 140 and sent to the route guidance control unit 200 described below through the navigation control unit 140.

The navigation control unit 140 may receive the information on the position of the own vehicle from the position information acquisition unit 120, the first map information from the storage 110, and the information on the set route and waypoints from the route setting unit 130, to thereby achieve the route guidance to the destination point for the occupant of the own vehicle.

In this example, the route guidance may be performed to guide the occupant to the destination point along the set route. For example, the route guidance may include displaying the route, performing the guidance on the route with sounds, performing the guidance on the route with characters, indicating a traveling direction, and providing the road information on the route.

The navigation control unit 140 may generate an image signal on the basis of the first map information, the information on the position of the own vehicle, the set route, the set waypoints, or control information received from the route guidance control unit 200 described below, and output the image signal to the display 150.

The display 150 may be, for example, a liquid crystal display (LCD). The display 150 may display, for example, a search result image on the basis of the image signal received from the navigation control unit 140. The search result image may include the first map information, the set route, the information on the position of the own vehicle, the waypoints, a map image and an intersection guidance image of a peripheral area around the position of the own vehicle, and detailed information on facilities obtained as a result of facility searching.

As illustrated in FIG. 1, the route guidance control unit 200 according to the first example embodiment includes a processor 210 and a memory 220.

The processor 210 may comprehensively control the route guidance control unit 200 in accordance with a control program stored in the memory 220 described below.

In the first example embodiment, the processor 210 may execute processing performed by a driving entity determination unit 211, an own-vehicle position determination unit 212, and a route guidance control unit 213 that are described below, for example.

The memory 220 may include, for example, a read-only memory (ROM) and a random access memory (RAM). The ROM may store the control program described above, and the RAM may store various kinds of data, for example.

In the first example embodiment, the processor 210 may store the route, the information on the position of the own vehicle, the first map information, and other pieces of information received from the vehicle navigation unit 100 in the RAM.

As illustrated in FIG. 1, the processor 210 may include the driving entity determination unit 211, the own-vehicle position determination unit 212, and the route guidance control unit 213.

The driving entity determination unit 211 may receive the information indicating in which mode of the automatic driving mode, the driving assistance mode (i.e., the mode in which the driving entity is the vehicle), and the manual drive mode (i.e., the mode in which the driving entity is the driver) the own vehicle is traveling from, for example, a vehicle control apparatus mounted in the own vehicle, to thereby determine the driving entity of the own vehicle. The driving entity determination unit 211 may output the result of determination to the route guidance control unit 213 described below.

The own-vehicle position determination unit 212 may determine whether the own vehicle has deviated from the set route on the basis of the first map information sent from the vehicle navigation unit 100 to the route guidance control unit 213 described below and stored in the memory 220, the information on the position of the own vehicle, the set route and waypoints, and other pieces of information. The own-vehicle position determination unit 212 may output the result of determination to the route guidance control unit 213.

The route guidance control unit 213 may generate control information on the basis of the result of determination as to whether the own vehicle has deviated from the set route received from the own-vehicle position determination unit 212, and the result of determination of the driving entity received from the driving entity determination unit 211, and output the generated control information to the navigation control unit 140.

The control information may include, for example, the information about stopping and restarting of the display of the route set by the vehicle navigation unit 100, stopping and restarting of the guidance on the route with sounds, stopping and restarting of the guidance on the route with characters, stopping and restarting of the indication of a traveling direction, stopping and restarting of the provision of the road information, such as traffic congestion information, on the route.

For example, in a case where it is determined that the own vehicle has deviated from the set route while the route guidance is being performed, the route guidance control unit 213 may output the control information for stopping the route guidance to the vehicle navigation unit 100.

In contrast, in a case where it is determined that the own vehicle has reached the next waypoint to pass through, the route guidance control unit 213 may output the control information for restarting the route guidance based on the first map information to the vehicle navigation unit 100.

Further, the route guidance control unit 213 may store the first map information received from the vehicle navigation unit 100, the information on the position of the own vehicle received from the navigation control unit 140, the information on the retrieved route and waypoints, and other pieces of information in the memory 220.

Exemplary processing performed by the vehicle navigation apparatus 1 according to the first example embodiment of the technology will now be described with reference to FIGS. 2 to 5.

Figure 2:
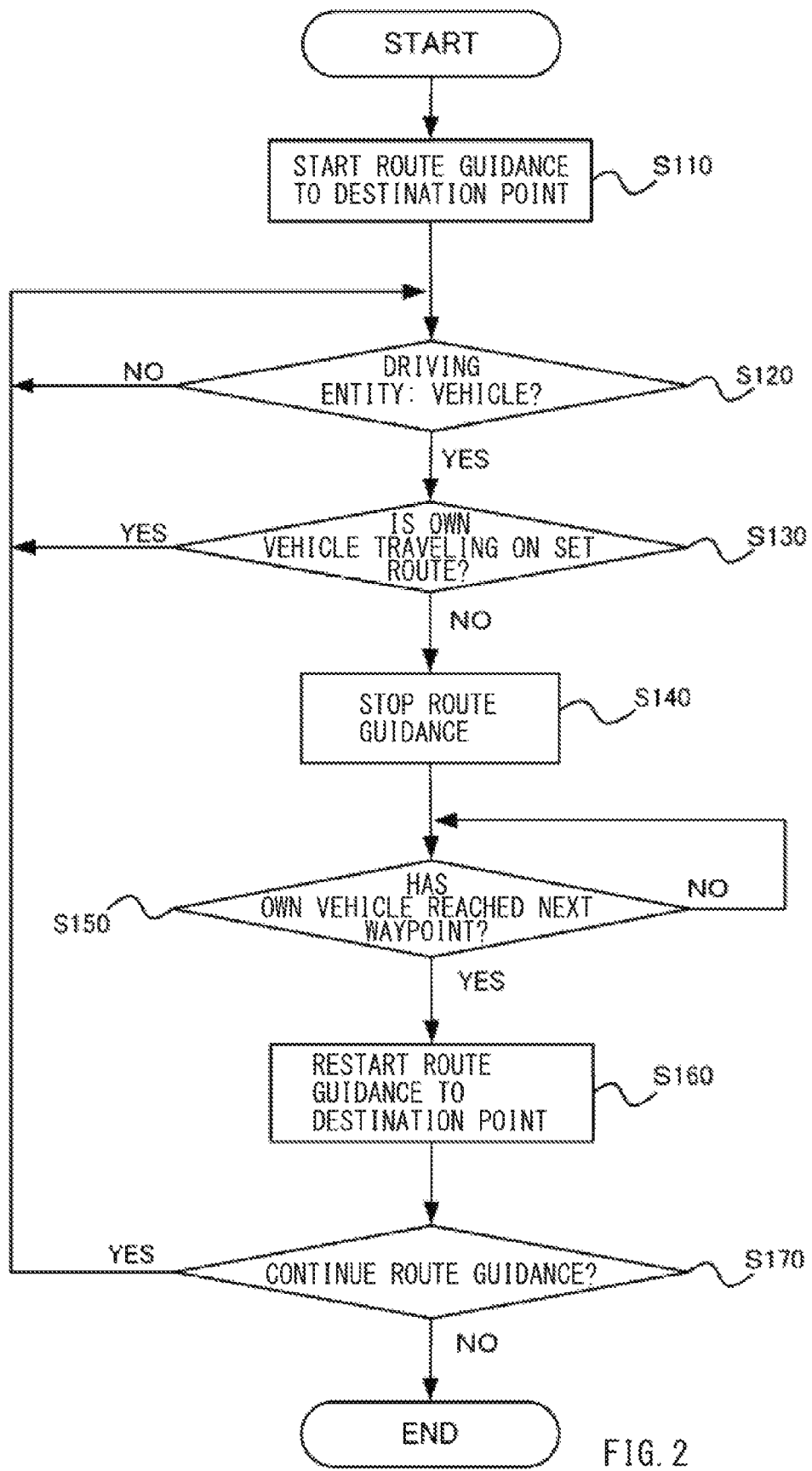
FIG. 2 is a flowchart illustrating an exemplary flow of processing performed by the vehicle navigation apparatus according to one example embodiment of the technology.

As illustrated in FIG. 2, in response to setting of a destination point by the occupant or driver who drives the own vehicle, the route setting unit 130 may set a route to the destination point, and output the set route to the navigation control unit 140.

The navigation control unit 140 may start route guidance to the destination point.

The navigation control unit 140 may generate an image signal for indicating the set route on the first map information, and cause the display 150 to display the set route to the destination point (Step S110).

Figure 3:
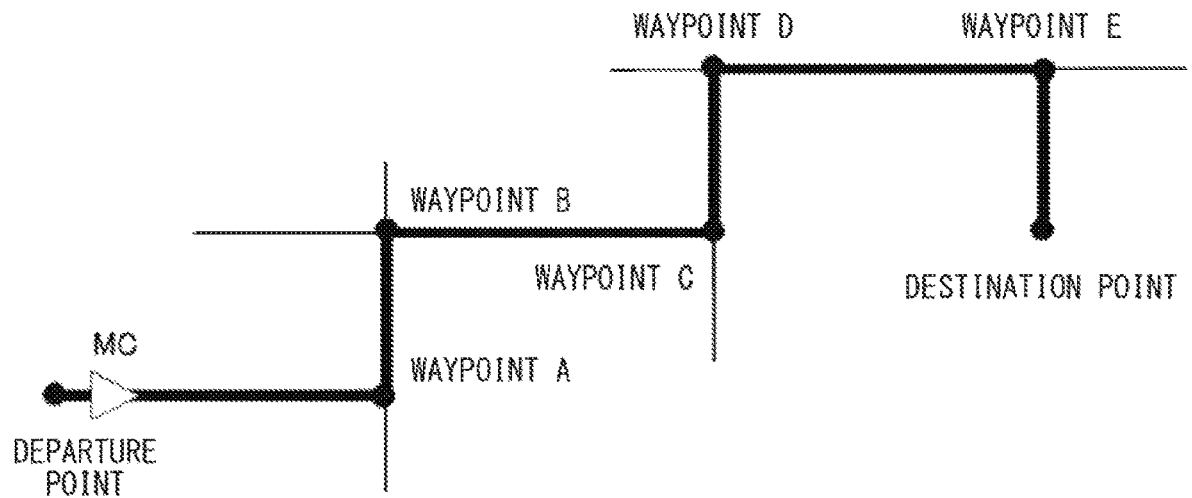
FIG. 3 is a diagram illustrating an exemplary route to a destination point displayed on the vehicle navigation apparatus according to one example embodiment of the technology.

For example, after the route guidance to the destination point being started, as illustrated in FIG. 3, the navigation control unit 140 may set, for example, a departure point, waypoints (e.g., waypoints A to E), the destination point, the route (e.g., a route indicated by a thick solid line), and the position of an own vehicle MC (e.g., a position indicated by a triangle), and convert them into image signals. The navigation control unit 140 may then cause the display 150 to display the image signals.

The driving entity determination unit 211 may determine the driving entity of the own vehicle on the basis of the information indicating in which mode of the automatic driving mode, the driving assistance mode, and the manual drive mode the own vehicle is traveling received from, for example, the vehicle control apparatus (Step S120).

If the driving entity determination unit 211 does not determine that the driving entity of the own vehicle is the vehicle itself (Step S120: NO), the processor 210 may repeat Step S120.

In contrast, if the driving entity determination unit 211 determines that the driving entity of the own vehicle is the vehicle itself (Step S120: YES), the own-vehicle position determination unit 212 may determine whether the own vehicle has deviated from the set route on the basis of the set route, the information on the position of the own vehicle, and other pieces of information (Step S130).

If the own-vehicle position determination unit 212 determines that the own vehicle is located on the set route and thus has not deviated from the set route (Step S130: YES), the processor 210 may cause the processing to return to Step S120.

In contrast, the own-vehicle position determination unit 212 determines that the own vehicle has deviated from the set route (Step S130: NO), the processor 210 may cause the processing to proceed to Step S140.

Figure 4:
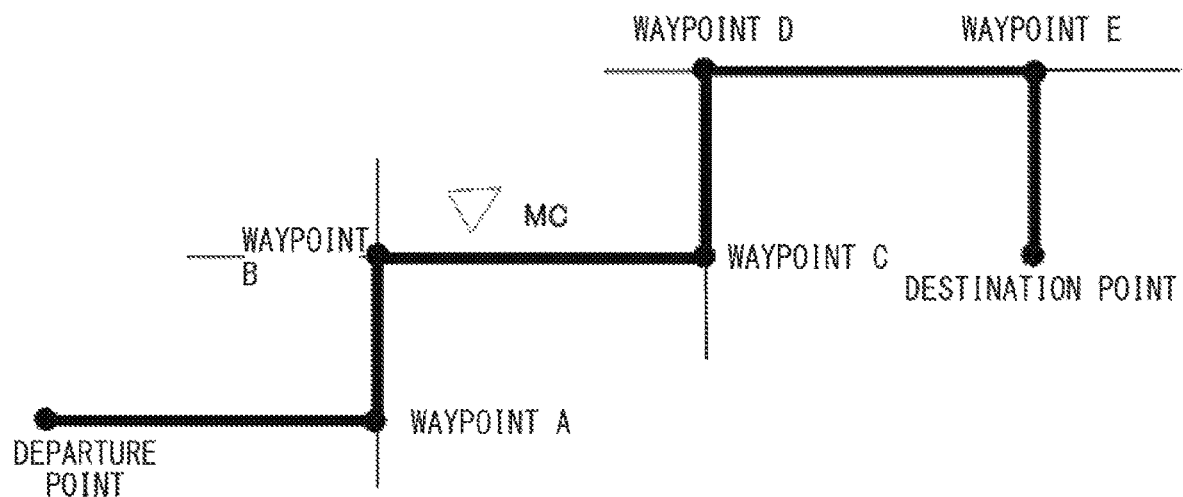
FIG. 4 is a diagram illustrating an exemplary route displayed on the vehicle navigation apparatus according to one example embodiment of the technology when an own vehicle deviates from a set route.

For example, as illustrated in FIG. 4, if the position of the own vehicle MC (indicated by a triangle) is not located on the route (indicated by a thick solid line), the own-vehicle position determination unit 212 may determine that the own-vehicle position has deviated from the set route.

On the basis of the result of determination by the own-vehicle position determination unit 212, the route guidance control unit 213 may generate the control information for stopping the route guidance which includes, for example, displaying the route set by the vehicle navigation unit 100, performing the guidance on the route with sounds, performing the guidance on the route with characters, indicating a traveling direction, and providing the road information, such as traffic congestion information, on the route, and output the generated control information to the navigation control unit 140.

The navigation control unit 140 may stop the route guidance (Step S140), and then the processor 210 may cause the processing to proceed to Step S150.

Figure 5:
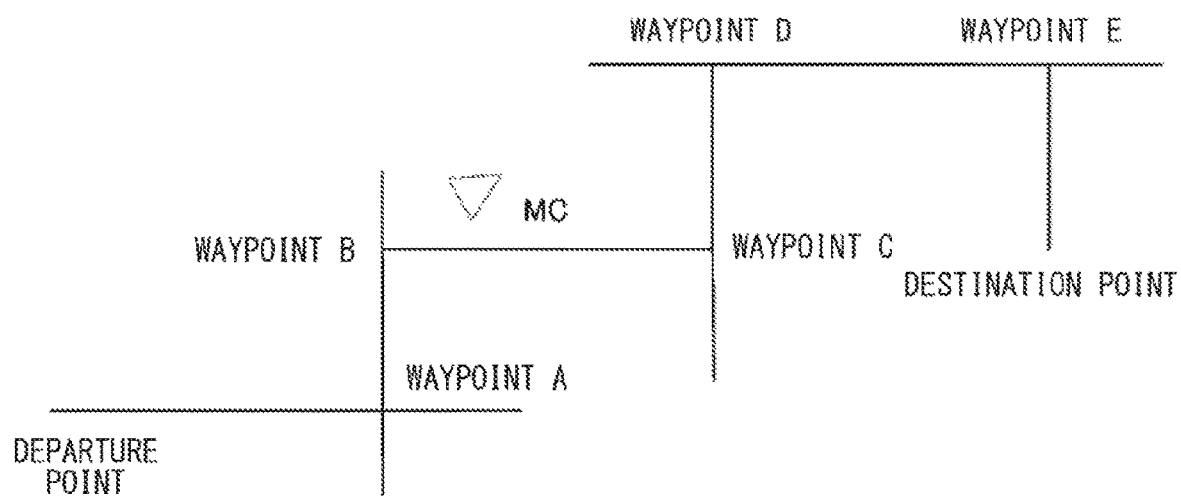
FIG. 5 is a diagram illustrating an exemplary route displayed on the vehicle navigation apparatus according to one example embodiment of the technology when route guidance is stopped.

In this case, the image indicating the set route with the thick solid line, which has been displayed on the display 150, may be changed to an image indicating the route with a thin solid line together with the position of the own vehicle MC (indicated by a triangle), as illustrated in FIG. 5, for example.

The own-vehicle position determination unit 212 may monitor the information on the position of the own vehicle and the information on the positions of the waypoints set on the route, and determine whether the own vehicle has reached the next waypoint to pass through (Step S150).

If the own-vehicle position determination unit 212 does not determine that the own vehicle has reached the next waypoint to pass through (Step S150: NO), the processor 210 may repeat Step S150.

In contrast, if the own-vehicle position determination unit 212 determines that the own vehicle has reached the next waypoint to pass through (Step S150: YES), the route guidance control unit 213 may generate the control information for restarting the route guidance which includes, for example, displaying the route set by the vehicle navigation unit 100, performing the guidance on the route with sounds, performing the guidance on the route with characters, indicating a traveling direction, and providing the road information, such as traffic congestion information, on the route, and output the generated control information to the navigation control unit 140.

Figure 6:
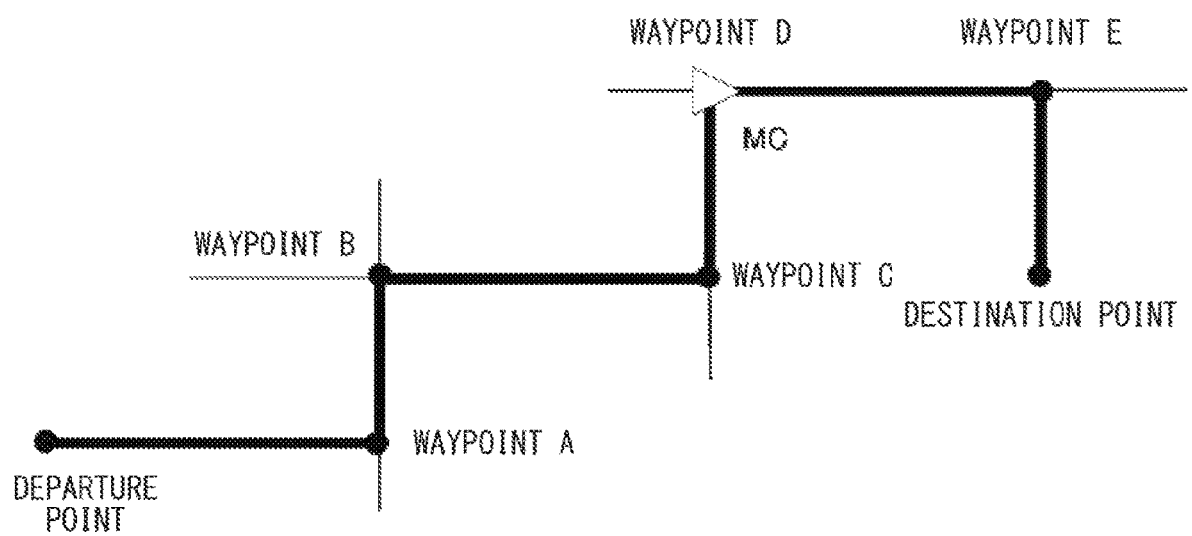

For example, as illustrated in FIG. 6, in a case where the position of the own vehicle MC (indicated by a triangle) is located on the next waypoint to pass through (e.g., the waypoint D), the own-vehicle position determination unit 212 determines that the own vehicle MC has reached the next waypoint to pass through, and cause the display 150 to display the image indicating the route with a thick solid line instead of the image indicating the route with the thin solid line, which has been displayed on the display 150, together with the own-vehicle position (indicated by an triangle) overlapping with the waypoint D.

Thereafter, the processor 210 may cause the processing to proceed to Step S160.

The navigation control unit 140 may restart the route guidance from the next waypoint that the own vehicle has reached to the set destination point on the basis of the control information received from the route guidance control unit 213 (Step S160).

If the route guidance to the set destination point is determined to be continued (Step S170: YES), the processor 210 may return the processing to Step S120.

In contrast, if the route guidance to the set destination point is not determined to be continued (Step S170: NO) for the reason that the driver or occupant of the own vehicle has cancelled or reset the route guidance to the destination point or that the own vehicle has reached the destination point or other reasons, the processor 210 may end the route guidance to the destination point.

As described above, the vehicle navigation apparatus 1 according to the first example embodiment includes the vehicle navigation unit 100 and the route guidance control unit 200. The route guidance control unit 200 determines the driving entity of the own vehicle. In a case where it is determined that the driving entity of the own vehicle is the vehicle itself and that the own vehicle has deviated from the set route, the route guidance control unit 200 stops the route guidance including displaying the route set by the navigation control unit 140, performing the guidance on the route with sounds, performing the guidance on the route with characters, indicating a traveling direction, and providing the road information on the route until the own vehicle reaches the next waypoint on the route to pass through.

That is, in a case where the position of the own vehicle of which driving entity is the vehicle itself and which is traveling on the route determined on the basis of the high-definition map information deviates from the route to the destination point determined on the basis of the first map information stored in the vehicle navigation unit 100, the route guidance, which includes displaying the route based on the first map information, performing the guidance on the route with sounds, performing the guidance on the route with characters, indicating a traveling direction, and providing the road information on the route, is stopped until the own vehicle reaches the next waypoint of the route to pass through.

For example, in a case where the own vehicle is displayed as deviating from the set route and traveling on another route inexistent in the first map information, the route guidance is stopped. Accordingly, it is possible to reduce the strange feeling of the occupant of the vehicle.

Further, the processor 210 of the vehicle navigation apparatus 1 according to the first example embodiment causes the vehicle navigation unit 100 to restart the route guidance on the basis of the first map information when the own vehicle reaches the next waypoint to pass through.

That is, when the own vehicle having deviated from the route to the destination point set by the occupant reaches the next waypoint to pass through set on the route while the route guidance is being stopped, the route guidance to the destination point based on the first map information is restarted.

Accordingly, it is possible to reduce the strange feeling of the occupant of the vehicle by restarting the route guidance when the own vehicle reaches the waypoint and is traveling on the route existent in the first map information.

A vehicle navigation apparatus 1A according to a second example embodiment will now be described with reference to FIGS. 7 to 10.

Note that components having the same configurations of those in the first example embodiment are denoted by the same reference numerals without a redundant description.

Figure 7:
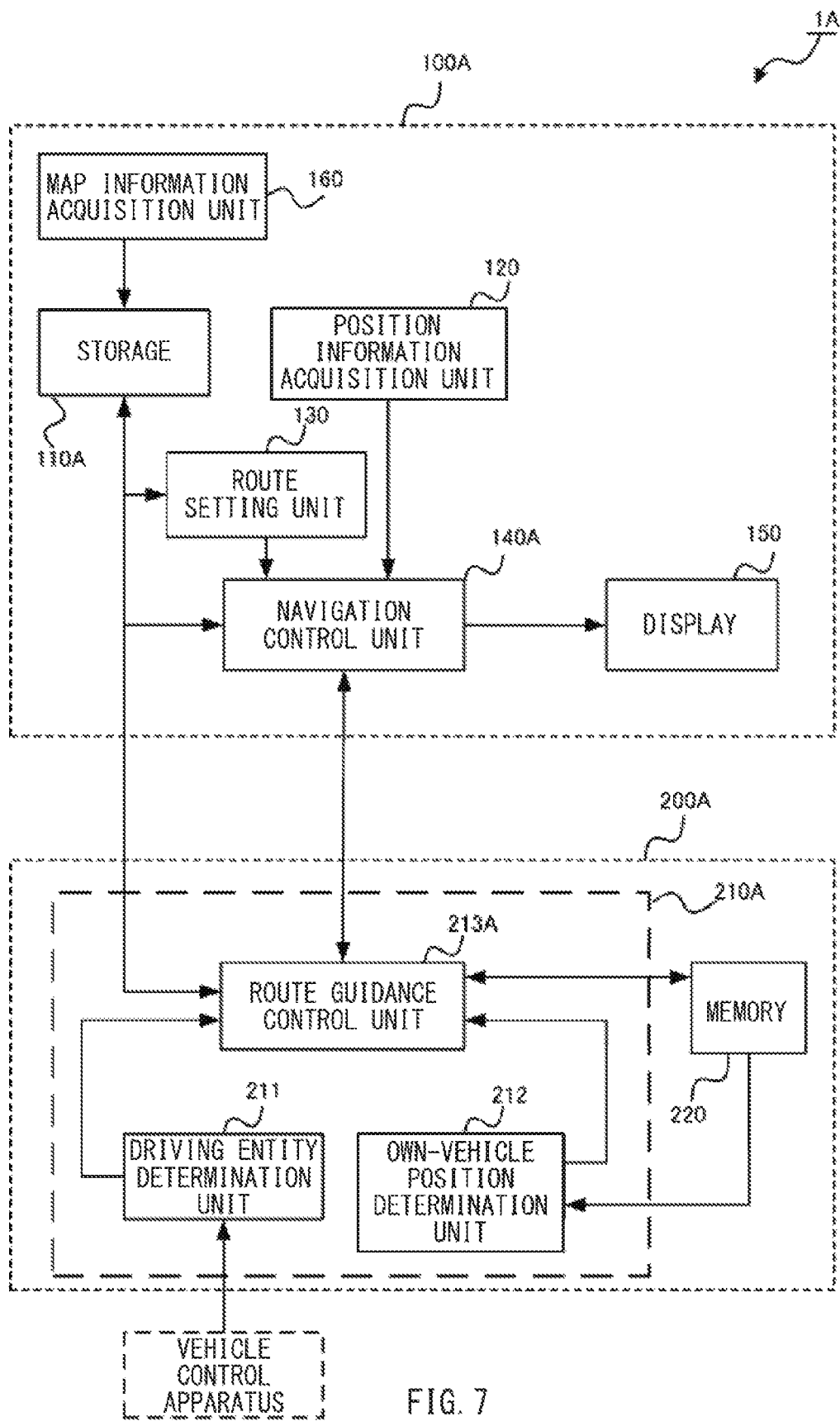
FIG. 7 is a block diagram illustrating an exemplary configuration of the vehicle navigation apparatus according to one example embodiment of the technology.

As illustrated in FIG. 7, the vehicle navigation apparatus 1A according to the second example embodiment includes a vehicle navigation unit 100A and a route guidance control unit 200A.

The vehicle navigation unit 100A searches for a route to a destination point set by the occupant of the vehicle on the basis of the information on the position of the own vehicle, the information on the destination point, and the first map information, and sets the route to the destination point. The set route may include waypoints which the own vehicle is to pass through.

The vehicle navigation unit 100A may receive second map information for achieving driving assistance control or automatic driving control.

In the second example embodiment, the route guidance control unit 200A described below may extract an estimated traveling route from a current position of the own vehicle to the next waypoint to pass through from the second map information. The vehicle navigation unit 100A may receive display control information about a change in the form of displaying, and cause the display 150 to display the estimated traveling route from the current position of the own vehicle to the next waypoint to pass through determined on the basis of the second map information.

The route guidance control unit 200A may determine whether the own vehicle has deviated from the set route on the basis of the driving entity information indicating in which mode of the automatic driving mode (i.e., the mode in which the driving entity is the vehicle itself), and the manual drive mode (i.e., the mode in which the driving entity is the driver) the own vehicle is traveling, the first map information, the set route, and other pieces of information.

In a case where the own vehicle traveling in the automatic driving mode or the driving assistance mode deviates from the set route, the route guidance control unit 200A may extract the estimated traveling route from the current position of the own vehicle to the next waypoint to pass through from the second map information, and output the display control information about a change in the form of displaying to the vehicle navigation unit 100A.

As illustrated in FIG. 7, the vehicle navigation unit 100A includes a storage 110A, the position information acquisition unit 120, the route setting unit 130, a navigation control unit 140A, the display 150, and a map information acquisition unit 160.

The storage 110A may store various kinds of programs necessary to operate the vehicle navigation unit 100A, the first map information, the second map information, the probe traffic information, and other pieces of information.

The navigation control unit 140A may receive the information on the position of the own vehicle from the position information acquisition unit 120, the first map information from the storage 110A, and the information on the set route and waypoints from the route setting unit 130, to thereby achieve route guidance to the destination point for the occupant of the own vehicle.

The navigation control unit 140A may also generate an image signal on the basis of the first map information, the information on the position of the own vehicle, the set route, the set waypoints, or the display control information received from the route guidance control unit 200A, and output the image signal to the display 150.

In a case where the own vehicle traveling in the mode in which the driving entity is the vehicle itself deviates from the set route while the route guidance is being performed, the navigation control unit 140A may extract the estimated traveling route from the current position of the own vehicle to the next waypoint to pass through on the basis of the display control information generated by the route guidance control unit 200A described below, and cause the display 150 to display the estimated traveling route in the changed form of displaying.

The information about the estimated traveling route to be displayed in the changed form may be displayed on the display 150 as follows: The display control information generated by the route guidance control unit 200A may be converted into an image signal, and the image signal may be synthesized with the image signal currently displayed. The synthesized image signal may be displayed on the display 150.

For example, the navigation control unit 140A may stop displaying the route set on the basis of the first map information, and then the route guidance control unit 200A may extract the estimated traveling route from the current position of the own vehicle to the next waypoint to pass through from the second map information. The route guidance control unit 200A may generate the display control information by adding the information about the estimated traveling route to be displayed in the changed form to the image signal indicating only the position of the own vehicle, and output the display control information to the navigation control unit 140A.

The map information acquisition unit 160 may acquire the second map information covering a necessary range from a map information storage device mounted in the own vehicle, and store the acquired second map information into the storage 110A. The second map information may be information for achieving the driving assistance control or the automatic driving control, for example.

As illustrated in FIG. 7, the route guidance control unit 200A according to the second example embodiment includes a processor 210A and a memory 220A.

The processor 210A may comprehensively control the route guidance control unit 200A in accordance with a control program stored the memory 220A described below.

In the second example embodiment, the processor 210A may execute processing performed by the driving entity determination unit 211, the own-vehicle position determination unit 212, and a route guidance control unit 213A that are described below, for example.

The memory 220A may store the second map information received through the route guidance control unit 213A described below together with the route, the information on the position of the own vehicle, the first map information, and other pieces of information received from the vehicle navigation unit 100A in a RAM.

As illustrated in FIG. 7, the processor 210A may include the driving entity determination unit 211, the own-vehicle position determination unit 212, and the route guidance control unit 213A.

In a case where the own vehicle traveling in the mode in which the driving entity is the vehicle itself deviates from the set route, the route guidance control unit 213A may set the next waypoint to pass through as a waypoint on the second map information, extract the estimated traveling route from a current position of the own vehicle to the next waypoint to pass through from the second map information, and output the display control information about a change in the form of displaying the estimated traveling route to the navigation control unit 140A.

Figure 8:
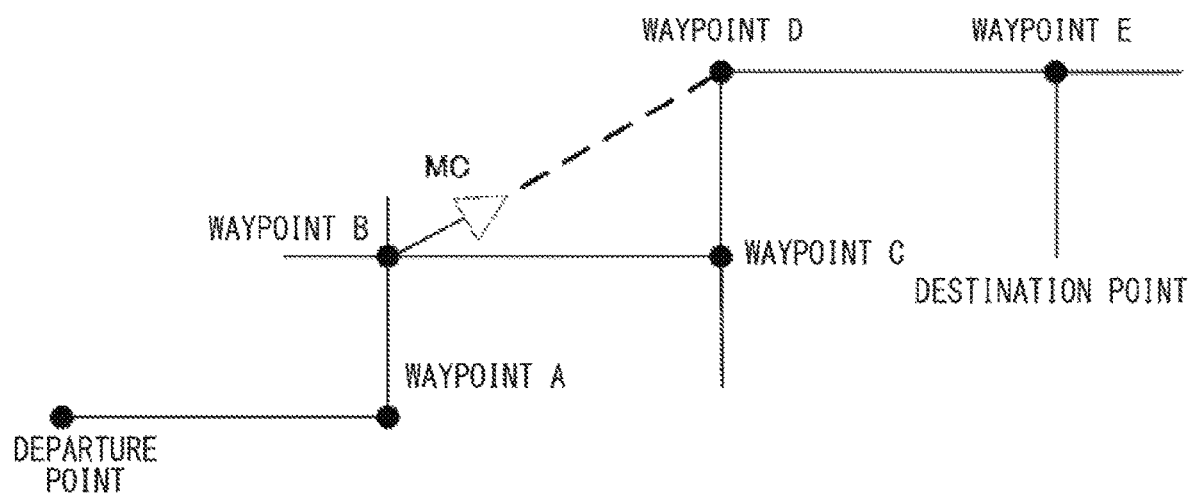
FIG. 8 is a diagram illustrating an exemplary estimated traveling route displayed on the vehicle navigation unit according to one example embodiment of the technology.

For example, as in FIG. 8 illustrating a route from the waypoint B existent in the second map information to the waypoint D existent in the second map information, the display control information may be generated so that an estimated traveling route from a current position of the own vehicle MC to the next waypoint to pass through, i.e., the waypoint D, is indicated by a dotted line, a route from the waypoint B, which the own vehicle has already passed through, to the current position of the own vehicle MC is indicated by a thin solid line, and a route based on the first map information may be indicated also by a thin solid line.

Exemplary processing performed by the vehicle navigation apparatus 1A according to the second example embodiment of the technology will now be described with reference to FIG. 9.

Figure 9:
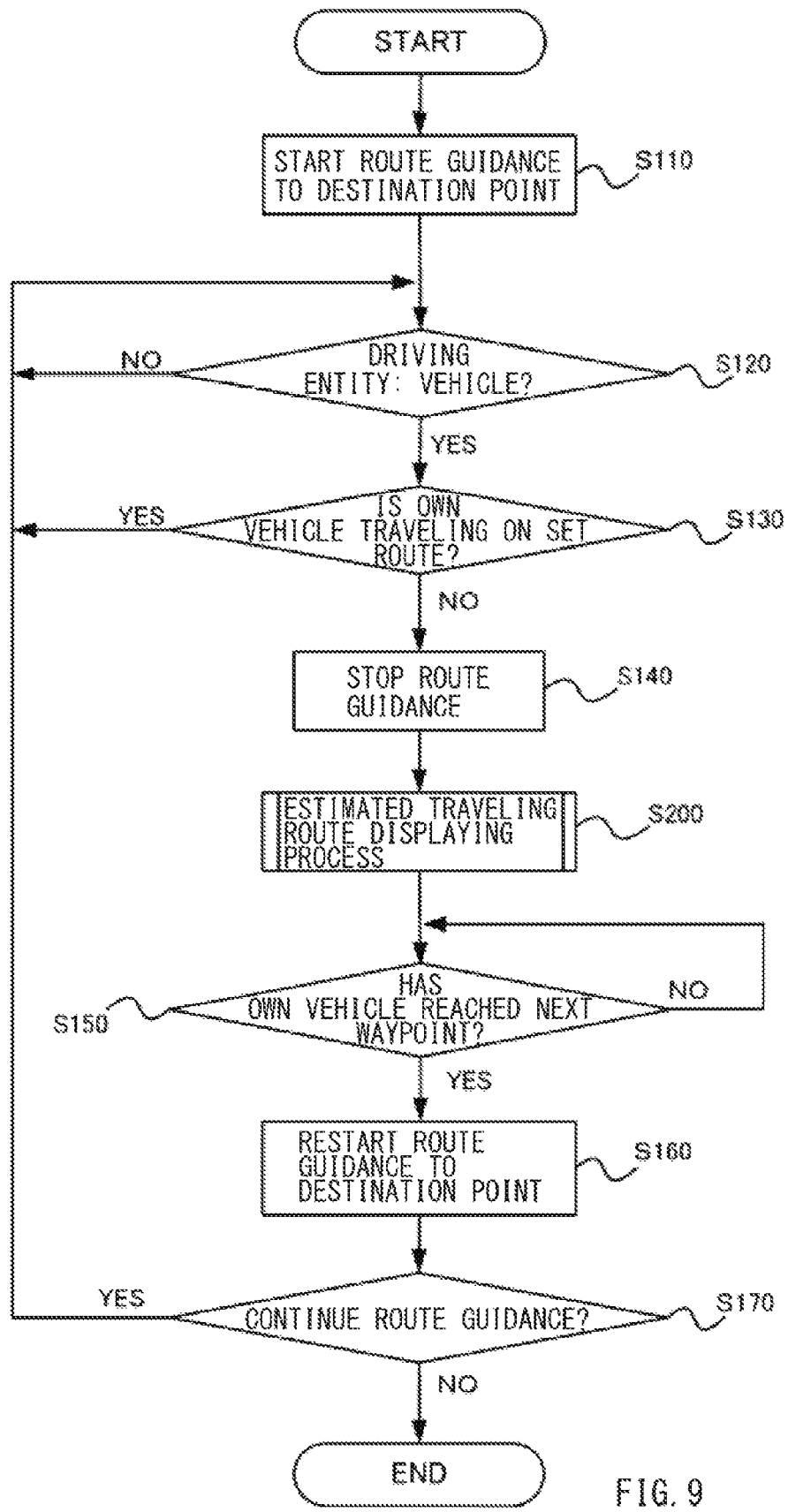
FIG. 9 is a flowchart illustrating an exemplary flow of processing performed by the vehicle navigation apparatus according to one example embodiment of the technology.

As illustrated in FIG. 9, in response to setting of a destination point by the occupant of the own vehicle, the route setting unit 130 may set a route to the destination point, and output the set route to the navigation control unit 140A.

The navigation control unit 140A may generate an image signal for indicating the set route on the first map information, and cause the display 150 to display the set route to the destination point (Step S110).

The driving entity determination unit 211 may receive the information indicating in which mode of the automatic driving mode, the driving assistance mode, and the manual drive mode the own vehicle is traveling, to thereby determine the driving entity of the own vehicle (Step S120).

If the driving entity determination unit 211 does not determine that the driving entity of the own vehicle is the vehicle itself (Step S120: NO), the processor 210A may repeat Step S120.

In contrast, if the driving entity determination unit 211 determines that the driving entity of the own vehicle is the vehicle itself (Step S110: YES), the own-vehicle position determination unit 212 may determine whether the own vehicle has deviated from the set route on the basis of the set route, the information on the position of the own vehicle, and other pieces of information (Step S130).

If the own-vehicle position determination unit 212 determines that the own vehicle is located on the set route and thus has not deviated from the set route (Step S130: YES), the processor 210A may cause the processing to proceed to Step S120.

In contrast, the own-vehicle position determination unit 212 determines that the own vehicle has deviated from the set route (Step S130: NO), the processor 210A may cause the processing to proceed to Step S140.

On the basis of the result of determination by the own-vehicle position determination unit 212, the route guidance control unit 213A may generate the control information for stopping the route guidance, and output the generated control information to the navigation control unit 140A.

The navigation control unit 140A may stop the route guidance (Step S140), and the processor 210A may cause the processing to proceed to Step S200 in which an estimated traveling route displaying process is performed.

In the estimated traveling route displaying process (Step S200), the route guidance control unit 213A may extract the estimated traveling route from a current position of the own vehicle to the next waypoint to pass through from the second map information, and output the display control information about a change in the form of displaying to the navigation control unit 140A.

The estimated traveling route displaying process is described in detail below.

The own-vehicle position determination unit 212 may monitor the information on the position of the own vehicle and the information on the positions of the waypoints set on the route, and determine whether the own vehicle has reached the next waypoint to pass through (Step S150).

If the own-vehicle position determination unit 212 does not determine that the own vehicle has reached the next waypoint to pass through (Step S150: NO), the processor 210 may repeat Step S150.

In contrast, if the own-vehicle position determination unit 212 determines that the own vehicle has reached the next waypoint to pass through (Step S150: YES), the route guidance control unit 213A may generate the control information for restarting the route guidance, and output the generated control information to the navigation control unit 140A.

Thereafter, the processor 210A may cause the processing to proceed to Step S160.

The navigation control unit 140A may restart the route guidance from the next waypoint that the own vehicle has reached to the set destination point (Step S160).

If the route guidance to the set destination point is determined to be continued (Step S170: YES), the processor 210A may return the processing to Step S120.

In contrast, if the route guidance to the set destination point is not determined to be continued (Step S170: NO) for the reason that the occupant of the own vehicle has cancelled or reset the route guidance to the destination point or that the own vehicle has reached the destination point or other reasons, the processor 210A may end the route guidance to the destination point.

Figure 10:
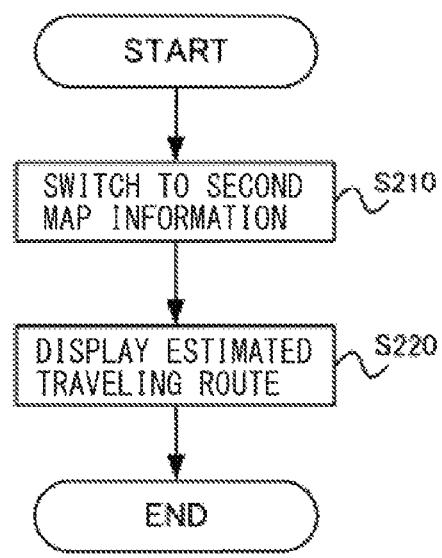
FIG. 10 is a flowchart illustrating an exemplary flow of an estimated traveling route displaying process performed by the vehicle navigation apparatus according to one example embodiment of the technology.

The estimated traveling route displaying process will now be described with reference to FIG. 10.

The route guidance control unit 213A may switch the map information from the first map information to the second map information (Step S210).

The route guidance control unit 213A may extract the estimated traveling route from a current position of the own vehicle to the next waypoint to pass through from the second map information, and output the display control information about a change in the form of displaying the estimated traveling route (e.g., the form of displaying the estimated traveling route with a dotted line) to the navigation control unit 140A, to thereby cause the display 150 to display the estimated traveling route (Step S220).

As described above, the vehicle navigation apparatus 1A according to the second example embodiment includes the vehicle navigation unit 100A and the route guidance control unit 200A. The vehicle navigation unit 100A includes the map information acquisition unit 160. In a case where the driving entity determination unit 211 determines that the driving entity of the own vehicle is the vehicle itself and where the own-vehicle position determination unit 212 determines that the own vehicle has deviated from the set route to the destination point set by the occupant of the own vehicle, the processor 210A stops the route guidance based on the first map information until the own vehicle reaches the next waypoint, extracts the estimated traveling route from a current position of the own vehicle to the next waypoint to pass through from the second map information, and output the display control information about a change in the form of displaying to the navigation control unit 140A, to thereby cause the display 150 to display the estimated traveling route.

That is, in a case where a discrepancy is generated between the traveling route based on the second map information, i.e., a high-definition map on which the own vehicle is traveling in the mode in which the driving entity is the vehicle itself and the route based on the first map information that is stored in the vehicle navigation unit 100A, the first map information may be switched to the second map information, and the estimated traveling route to the next waypoint to pass through may be displayed.

Accordingly, in a case where the own vehicle is traveling on a route inexistent in the first map information with deviating from the set route, for example, the estimated traveling route existent in the second map information may be displayed. It is therefore possible to reduce the strange feeling of the occupant of the own vehicle.

The vehicle navigation apparatus according to one or more example embodiments of the technology may be achieved by storing the processing to be performed by the processor 210 or 210A in a recording medium readable by a computer system, causing the memory 220 or 220A to read a program stored in the recording medium, and executing the program.

The term "computer system" used herein may refer to hardware including operating systems (OS) and peripheral devices.

Note that a plurality of processors 210 or a plurality of processors 210A may be provided. Additionally, a plurality of memories 220 or a plurality of memories 220A may be provided.

In a case where the computer system is a world wide web (www) system, the term "computer system" used herein may encompass a website providing environment or a display environment.

Additionally, the program stored in, for example, a storage device of the computer system may be transmitted to another computer system via a transmission medium or a transmission wave of the transmission medium.

The transmission medium transmitting the program may refer to a medium having a function of transmitting information, including a network such as the Internet (a communication network) and a communication line such as a phone line (a communication line).

Further, the program described above may be a program for implementing part of the processing performed by the vehicle navigation apparatus according to the example embodiment of the technology described above.

Alternatively, the program described above may be a so-called differential file or differential program that implements the processing performed by the vehicle navigation apparatus according to the example embodiment described above when being combined with the program stored in the computer system in advance.

Some example embodiments of the technology have been described above with reference to the drawings. However, specific configurations of the technology should not be limited to these example embodiments, and may be modified in variety of ways without departing from the gist of the technology.

One or more of the position information acquisition unit 120, the route setting unit 130, the navigation control unit 140, and the route guidance control unit 213 in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the position information acquisition unit 120, the route setting unit 130, the navigation control unit 140, and the route guidance control unit 213. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the position information acquisition unit 120, the route setting unit 130, the navigation control unit 140, and the route guidance control unit 213.

The invention claimed is:

1. A vehicle navigation apparatus comprising:
a storage configured to store first map information,
a display,
a processor; and
a memory communicably coupled to the processor, storing instructions for causing the processor to:

acquire information on a position of a vehicle from at least one of a sensor or a GPS receiver, receive a destination point set by an occupant of the vehicle, retrieve the first map information stored in the storage, set a route to the destination point on a basis of the information on the position of the vehicle, information on the destination point, and the first map information, the route including one or more waypoints that the vehicle is to pass through, generate an image signal on a basis of the set route, and display at least the first map information, the route, and the information on the position of the vehicle on the display for the occupant of the vehicle on a basis of the generated image signal, and perform guidance causing the vehicle to travel to the destination point along the route set by the route setting unit for the occupant, control a form of displaying the route on the display, determine a driving entity of the vehicle, in response to the determination that the driving entity of the vehicle being the vehicle itself, determine whether the vehicle is traveling along another route inexistent in the first map information, deviating from the route set on a basis of the first map information, and in response to the determination that the vehicle is traveling along another route inexistent in the first map information, stop the guidance until the vehicle reaches a next waypoint among the one or more waypoints of the first map information that the vehicle is to pass through next, the guidance including displaying the route, performing the guidance on the route with sounds, performing the guidance on the route with characters, indicating a traveling direction, and providing road information on the route.

2. The vehicle navigation apparatus according to claim 1, wherein the processor is configured to restart the guidance based on the first map information after the vehicle reaches the next waypoint.

3. The vehicle navigation apparatus according to claim 1, wherein the storage further stores second map information, the processor is further configured to:

extract an estimated traveling route from a current position of the vehicle to the next waypoint from the second map information, and output display control information about a change in the form of displaying to the navigation control unit.

4. The vehicle navigation apparatus according to claim 2, wherein the storage further stores second map information, the processor is further configured to:

extract an estimated traveling route from a current position of the vehicle to the next waypoint from the second map information, and output display control information about a change in the form of displaying to the navigation control unit.

5. A vehicle navigation apparatus comprising:

a storage configured to store first map information;

circuitry configured to acquire information on a position of a vehicle from at least one of a sensor or a GPS receiver, receive a destination point set by an occupant of the vehicle, retrieve the first map information stored in the storage, set a route to the destination point on a basis of the information on the position of the vehicle, information on the destination point, and the first map information, the route including one or more waypoints that the vehicle is to pass through, generate an image signal on a basis of the set route, perform guidance causing the vehicle to travel to the destination point along the route for the occupant, the guidance including displaying the route, performing the guidance on the route with sounds, performing the guidance on the route with characters, indicating a traveling direction, and providing road information on the route, and determine a driving entity of the vehicle; and a display configured to display at least the first map information, the route, and the information on the position of the vehicle on the display for the occupant of the vehicle on a basis of the generated image signal, wherein the circuitry is configured to control a form of displaying the route on the display, determine a driving entity of the vehicle, in response to the circuitry determines that the driving entity of the vehicle being the vehicle itself, determine whether the vehicle is traveling along another route inexistent in the first map information, deviating from the route set on a basis of the first map information, and in response to the circuitry determines that the vehicle is traveling along another route inexistent in the first map information, stop the guidance until the vehicle reaches a next waypoint among the one or more waypoints of the first map information that the vehicle is to pass through next.

6. The vehicle navigation apparatus according to claim 5, wherein the circuitry is configured to:

restart the guidance based on the first map information after the vehicle reaches the next waypoint.

7. The vehicle navigation apparatus according to claim 5, wherein the storage further stores second map information, the circuitry is further configured to:

extract an estimated traveling route from a current position of the vehicle to the next waypoint from the second map information, and output display control information about a change in the form of displaying to the navigation control unit.

8. The vehicle navigation apparatus according to claim 6, wherein the storage further stores second map information, the circuitry is further configured to:

extract an estimated traveling route from a current position of the vehicle to the next waypoint from the second map information, and output display control information about a change in the form of displaying to the navigation control unit.

* * * * *